Patented Apr. 23, 1935

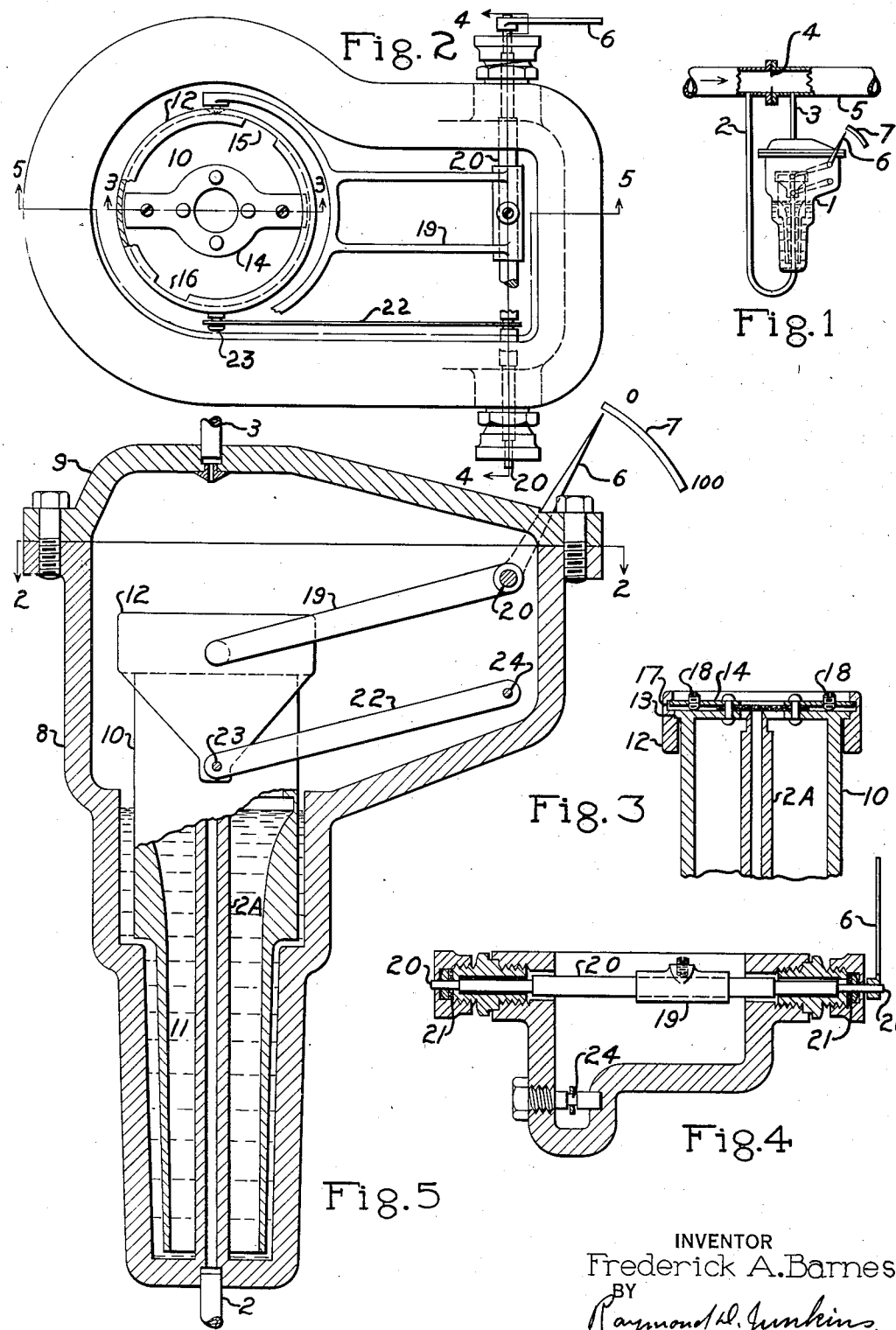

1,999,029

UNITED STATES PATENT OFFICE 1,999,029

MEASURING INSTRUMENT

Frederick A. Barnes, Cleveland Heights, Ohio, assignor to Bailey Meter Company, a corporation of Delaware Application July 30, 1932, Serial No. 627,054

8 Claims. (Cl. 73—31)

My invention relates to measuring instruments and, in particular, to pressure gages such, for example, as differential pressure gages for measuring the rate of flow of fluids. In such measuring instruments, a movable member, such as a pressure receiving liquid sealed bell, may assume a position representative of the variable to be measured, and the positioning of the member is utilized to position a pointer relative to an index, or a marker relative to a record chart, for indicating the value of the variable.

I provide by my invention, in connection with such a measuring instrument, an improved arrangement and construction of parts, whereby the movable member is guided in its travel and may readily be removed for cleaning, inspection, etc., as well as having other advantageous features of construction.

I have chosen to illustrate and describe as a preferred embodiment of my invention, a rate of flow meter for fluids comprising a differential pressure responsive measuring instrument of the liquid sealed bell type. It will be understood that the invention in its broader aspects may be carried out equally as well with measuring instruments of other types and for other purposes as, for example, those utilizing floats in place of liquid sealed bells and for measuring pressures in relation to the pressure of the atmosphere, where the pressure compared to that of the atmosphere is a static pressure rather than a differential pressure representative of fluid rate of flow.

In the drawing:

Fig. 1 is a somewhat diagrammatic representation of a fluid flow meter embodying the invention.

Figs. 2–5 are sectional showings of the flow meter of Fig. 1 and in which:

Fig. 2 is a plan view of the flow meter below the cover as indicated by the line 2—2, in the direction of the arrows, of Fig. 5.

Fig. 3 is a sectional elevation of a part of the flow meter in the direction of the arrows along the line 3—3 of Fig. 2.

Fig. 4 is a sectional elevation of Fig. 2 in the direction of the arrows along the line 4—4.

Fig. 5 is a sectional elevation of Fig. 2 in the direction of the arrows along the line 5—5, and further including a sectional showing of the cover of the flow meter above the line 2—2.

Referring first to Fig. 1, I show therein a pressure differential responsive fluid rate of flow meter 1, connected by the pipes 2, 3 to opposite sides of an orifice 4 positioned across a conduit 5 through which fluid is flowing in the direction of the arrow. The flow meter 1 is of a differential pressure responsive type, having a liquid sealed bell shaped in contour and with walls of material thickness, for positioning a pointer 6 relative to an index 7 directly in terms of fluid rate of flow; the design of the liquid sealed bell adapted to correct the quadratic relation between fluid rate of flow and differential pressure across an orifice to a linear relation in known manner. Such a fluid flow meter having a shaped bell for the purpose stated, is known by the patent to Ledoux 1,064,748.

The other views of the drawing are sectional showings of the flow meter 1, which, in Fig. 1, shows in diagrammatic fashion only, the liquid sealed bell and its means of support and guidance. Flow meter 1 comprises in general a pressure holding casing 8, having a removable cover 9. Within the casing 8, adapted for substantially vertical motion responsive to changes in pressure differential, is a shaped bell 10 sealed by a liquid 11, such as mercury (Fig. 5). Relatively high pressure from the inlet side of the orifice 4 is conducted through the pipe 2 and an extension 2A thereof, to within the bell 10, while relatively low pressure from the conduit 5 at the outlet side of the orifice 4, is conducted through the pipe 3 to the casing 8 at the outside of the bell 10. When the pressures available through the pipes 2, 3 are equal, the bell is adapted to rest in its lowermost or zero flow position, there being no pressure differential effective upon the sealing liquid 11 and the bell 10. When, however, fluid flows through the orifice 4, thereby creating a pressure differential bearing a known relation to the rate of fluid flow, this pressure differential is impressed upon the bell 10 and its sealing liquid 11, to the end that the bell 10 is positioned vertically upward from its lowermost position of rest, and directly proportional to the rate of fluid flow.

For holding the bell 10 and guiding it in its vertical positioning, I provide a sleeve 12 having novel means for supporting and holding the bell and allowing its ready removal for inspection and cleaning. The sleeve 12 is shown in elevation (Fig. 5), plan (Fig. 2) and sectional elevation (Fig. 3). In Fig. 3, the bell 10 is shown in its lowermost travel position resting upon the top of the extension 2A of the pressure pipe 2. The sleeve 12 is so shaped that the bell may be lowered through it until a flange 13 of the bell comes to rest upon a shoulder of the interior of the sleeve. Across the top of the bell is fastened a flexibly resilient member 14 comprising normally horizontal arms extending beyond the greatest diameter of the flange 13, and adapted to pass readily through openings 15, 16, into a recess 17, at the top of the sleeve 12. When the bell 10 is lowered down through the sleeve 12, the radial extending arms of the member 14 are placed in line with the openings 15, 16, and the bell lowered until its flange 13 engages the corresponding shoulder of the sleeve 12. The bell is then turned, for example, 60 degrees, in either direction, to assume a position (Fig. 2) wherein the radially extending arms of the member 14 are in the circumferential recess 17 in the wall of the sleeve. Locking screws 18, threaded through the member 14, are then screwed downward, forcing upwardly the flexible ends of the member 14 against the uppermost edge of the circumferential recess 17, to hold the bell 10 against rotary or other motion relative to the sleeve 12.

In measuring instruments of the type described, it is often desirable to remove the bell or other responsive element from the device for purposes of inspection or cleaning. This I readily accomplish with the locking means hereinbefore described by providing the circumferential recess 17 with the openings 15, 16. When it is desired to remove the bell, the locking screws 18 are turned to allow the flexibly resilient arms of the member 14 to assume their normal horizontal position, whereupon the locking action is removed and the bell may be rotated relative to the sleeve until the arms are adjacent to the openings, whereupon the bell may be readily lifted upward through and from the sleeve.

The sleeve 12 is pivotally connected with a forked beam or lever 19 which has a pivotal bearing consisting of a spindle 20 extending through opposite sides of the casing 8 through suitable pressure tight bearings, such as 21. At one end outside of the casing 8, the indicator arm 6 is fastened to the spindle extension and adapted upon rotation of the spindle, to move relative to the index 7. The arrangement is such that when the sleeve 12 moves vertically in casing 8, the forked lever 19 is angularly moved and positions in rotary motion the spindle 20 and the indicator 6 relative to the scale 7; thus, external of the casing 8 is visually advised the vertical position of the sleeve 12 and correspondingly of the bell 10 suspended therefrom.

A feature of my invention consists in the means I have provided for constraining the bell to motion along a desired path throughout the range of its operation. In instruments of the type described, wherein a liquid sealed bell or other member movably responsive to a variable is employed, it is necessary to provide means for maintaining the bell in desired positions throughout the range of its movement. For example, if the sealing liquid 11 is mercury and the bell 10 of cast iron, the relation of the metacenter with the center of buoyancy might be such that the lower end of the bell 10 would tend to float up in one direction or the other, causing it to rub the walls of the chamber 8 in its vertical positioning. In some instruments of this general type, a counterweight has been suspended external and surrounding the bell at its lower end, or even internally of the bell, so that it will always hang vertically in its positioning. Such arrangement, however, requires an increased internal size of the chamber 8 and corresponding increase in amount of sealing fluid, such as mercury, which is expensive.

In my preferred arrangement, I provide the casing 8 at its lower portion elliptical in cross sectional contour, having the greater length of the ellipse shown in section (Fig. 5) and the shortest length normal to the drawing sheet. Thus, a minimum of clearance between the outermost side of the bell 10 and the innermost side of the reservoir 8 exists on two sides, with corresponding reduction in the amount of mercury necessary. I then constrain the motion of the bell into one plane through guiding it additionally to the supporting forked lever 19. With such guiding I may include in the upper portion or extension of the bell 10, the necessary weight required of such a bell, and without having the weight so located tend to cause the bell 10 to move upwardly or downwardly in other than a vertical position.

The means which I have provided for insuring that the bell 10 be always in a vertical position, and for constraining the bell to motion along a desired path in a single plane, comprises a single arm or link 22 pivotally connected to the sleeve 12 at 23, and oscillatable about a pivotal bearing formed in the casing 8 at 24. The arm or link 22 is parallel to and of the same effective length between its pivot centers as the forked lever 19, and it is evident that the sleeve and bell assembly will remain in a vertical position as they move in response to changes in pressure differential applied thereto.

By stating that the bell and its connected parts are constrained to move along a desired or definite path in a single plane, I realize that the bell and its parts have thickness and therefore, strictly speaking, do not all lie in a single plane of space. I mean that each point of the moving system follows a definite path of movement in a plane and that therefore the action of movement of the system as a whole is in a definite path in a plane as distinguished from a construction wherein a bell, such as the bell 10, would be suspended from a single point or connection in a manner such that the effect of gravity, flotation and/or differential pressure acting upon the bell, might cause it to wobble or swing around and any point of it to assume a different path in a different plane one time from another. In other words, the bell and its connected parts always tend to travel along a definite and distinct guided path, and I believe that the best way to express such guided motion is to say that the bell and its connected parts move along a desired path in a single plane.

The wall of the bell 10 is of material thickness as illustrated, and in operation, upon a change in the rate of fluid flow through the conduit 5, the bell will be positioned vertically until the change in upward force caused by the variation in the difference in the pressure exerted on the interior of the bell and that exerted on the exterior of the bell, has been counterbalanced by the increase or decrease in the buoyancy of the bell as its wall moves into or out of the sealing liquid; the position of the indicator 6 relative to the index 7 is, therefore, a measure of the pressure differential which, in the described illustration, is readable upon the index directly in rate of flow through the shaping of the wall of the bell 10. That is, the vertical motion or positioning of the bell 10 is directly proportional to the changes in rate of fluid flow, automatically correcting by its wall thickness submerged for varying differential pressure in functional relation to the rate of fluid flow.

It will be evident that the improved arrangement and means comprising my invention may be equally applicable in the positioning of other members than liquid sealed bells, and for other than fluid flow meters. For instance, I might so guide the vertical positioning of a float on the surface of a liquid whose level is varied, in any desired manner. Or I might utilize the invention in connection with a static pressure gage, etc.

What I claim as new, and desire to secure by Letters Patent of the United States, is:

1. A pressure measuring instrument having a casing, a member within the casing adapted to be positioned responsive to variations in pressure to be measured, a sleeve detachably connected to the member and lever means between the sleeve and casing for constraining the movement of the member to a fixed path.

2. A pressure measuring instrument having a casing, a member within the casing adapted to be positioned responsive to variations in pressure to be measured, means for indicating the position of the member externally of the casing, and intermediate means between the member and the first-named means, said intermediate means comprising a sleeve detachably secured to the member, said sleeve being pivotally attached to the first-named means.

3. A differential pressure responsive device having a sleeve adapted to be held vertical while moved in a predetermined path in a plane in space, parallel levers pivotally connected at the sleeve and to fixed spaced pivots one of which constitutes a spindle, a pressure receiving bell, a liquid seal for the bell, an indicator of bell position moved by the spindle, and locking means for detachably connecting the sleeve to the bell.

4. A pressure measuring instrument having a casing, a bell within the casing adapted to be positioned responsive to variations in pressure to be measured, a liquid seal for the bell, means including a sleeve for constraining the movement of the bell to a fixed path in a plane in space, and means for detachably connecting the bell to said sleeve.

5. A pressure responsive device having a sleeve adapted to be held vertical while moved in a predetermined path in a plane in space, parallel levers pivotally connected at the sleeve and to fixed spaced pivots, a member adapted to be positioned responsive to variations in the pressure to be measured, and locking means for detachably connecting the sleeve to the member.

6. A pressure measuring device, comprising in combination, a casing, a member adapted to be positioned in said casing responsive to variations in the pressure to be measured, indicating means, connections between the said member and indicating means including a sleeve adapted to receive said member, a plurality of radially disposed horizontal flexible resilient arms secured to said member, and means for bowing said arms to bear against said sleeve whereby the said member may be locked to said sleeve.

7. A pressure measuring device, comprising in combination, a casing, a member adapted to be positioned in said casing responsive to variations in the pressure to be measured, indicating means positioned by said member and connections therebetween including, a sleeve, one end of said sleeve recessed and adapted to receive a flange on said member, a plurality of radially disposed horizontal flexible resilient arms secured to said member and extending beyond said flange into a circumferential recess in said sleeve, screw means for bowing said arms to bear against the wall of said recess whereby said member may be locked to said sleeve, and the side of said recess ported to provide for the removal and re-entry of the member in the sleeve.

8. A pressure measuring instrument having a casing, a member within the casing adapted to be positioned responsive to variations in pressure to be measured, a sleeve detachably secured to the member and laterally disposed parallel motion constraining means inter-connecting said sleeve and casing, whereby said member may be removed axially through said sleeve upon release of the detachable connection.

FREDERICK A. BARNES.